(12) United States Patent
Tanimura et al.

(10) Patent No.: US 10,533,458 B2
(45) Date of Patent: Jan. 14, 2020

(54) TURBINE VENTILATION STRUCTURE

(71) Applicant: KAWASAKI JUKOGYO KABUSHIKI KAISHA, Kobe-shi, Hyogo (JP)

(72) Inventors: Kazuhiko Tanimura, Akashi (JP); Hiroshi Taki, Akashi (JP); Katsuyoshi Obayashi, Kakogawa (JP); Kei Takashima, Himeji (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 530 days.

(21) Appl. No.: 15/285,910

(22) Filed: Oct. 5, 2016

(65) Prior Publication Data

US 2017/0022843 A1    Jan. 26, 2017

Related U.S. Application Data

(63) Continuation of application No. PCT/JP2015/060461, filed on Apr. 2, 2015.

(30) Foreign Application Priority Data

Apr. 7, 2014    (JP) ................................. 2014-078651

(51) Int. Cl.
*F01D 25/30*    (2006.01)
*F01D 9/02*    (2006.01)
(Continued)

(52) U.S. Cl.
CPC ............... *F01D 25/30* (2013.01); *F01D 9/02* (2013.01); *F01D 25/24* (2013.01); *F02C 7/04* (2013.01);
(Continued)

(58) Field of Classification Search
CPC . F01D 25/30; F01D 9/02; F01D 9/065; F01D 25/125; F01D 25/24; F01D 25/14; F01D 25/162
See application file for complete search history.

(56) References Cited

U.S. PATENT DOCUMENTS 2,744,722 A    5/1956    Orr et al.
3,970,252 A    7/1976    Smale et al.
(Continued)

FOREIGN PATENT DOCUMENTS

CN    101743391 A    6/2010
CN    102844527 A    12/2012
(Continued)

OTHER PUBLICATIONS

Communication dated Dec. 8, 2017 from the European Patent Office in counterpart application No. 15777352.4.
(Continued)

*Primary Examiner* — Woody A Lee, Jr.
*Assistant Examiner* — Sabbir Hasan
(74) *Attorney, Agent, or Firm* — Sughrue Mion, PLLC

(57) ABSTRACT

A turbine ventilation structure includes: an exhaust diffuser including inner and outer tubes to form an exhaust passage for exhaust gas; a strut extending across the exhaust diffuser from a housing to support a bearing inside the inner tube; a strut cover in the exhaust passage that covers the strut; and a connecting member disposed downstream of the strut cover and including a hollow portion to connect the housing and the inner tube. The housing includes a first intake port to introduce an air from outside. The strut cover has a discharge hole at a rear edge portion thereof. The turbine ventilation structure includes a first ventilation passage extending from the first intake port through the hollow portion, then extending from an inner end portion of the strut
(Continued)

through between the strut and the strut cover, and the discharge hole, into the exhaust passage.

8 Claims, 5 Drawing Sheets

(51) Int. Cl.
    *F01D 25/24*     (2006.01)
    *F02C 7/04*     (2006.01)

(52) U.S. Cl.
    CPC .... *F05D 2220/32* (2013.01); *F05D 2260/608* (2013.01)

(56) References Cited

U.S. PATENT DOCUMENTS

| | | | | |
|---|---|---|---|---|
| 5,020,318 | A * | 6/1991 | Vdoviak | F01D 9/065 |
| | | | | 60/226.1 |
| 5,152,661 | A | 10/1992 | Sheets | |
| 7,373,773 | B2 * | 5/2008 | Noda | F01D 5/081 |
| | | | | 60/266 |
| 8,029,234 | B2 | 10/2011 | McCaffrey | |
| 8,641,362 | B1 | 2/2014 | Liang | |
| 8,740,550 | B2 * | 6/2014 | Tanioka | F01D 5/081 |
| | | | | 415/116 |
| 8,893,509 | B2 * | 11/2014 | Tanimura | F01D 25/30 |
| | | | | 60/785 |
| 2003/0059577 | A1 | 3/2003 | Morrison et al. | |
| 2005/0050898 | A1 | 3/2005 | Noda | |
| 2009/0028698 | A1 | 1/2009 | McCaffrey | |
| 2010/0322759 | A1 | 12/2010 | Tanioka | |
| 2011/0138819 | A1 | 6/2011 | Tanimura | |
| 2012/0186261 | A1 | 7/2012 | Toprani et al. | |
| 2013/0064647 | A1 | 3/2013 | Hashimoto | |
| 2013/0084172 | A1 | 4/2013 | Kasibhotla et al. | |
| 2013/0149107 | A1 | 6/2013 | Munshi et al. | |
| 2013/0170972 | A1 | 7/2013 | Broeker et al. | |

FOREIGN PATENT DOCUMENTS

| | | |
|---|---|---|
| CN | 103109045 A | 5/2013 |
| EP | 2 022 938 A2 | 2/2009 |
| JP | 56-129725 A | 10/1981 |
| JP | 1-187323 A | 7/1989 |
| JP | 2004-197696 A | 7/2004 |
| JP | 2005-83199 A | 3/2005 |
| JP | 2007-192028 A | 8/2007 |
| JP | 2009-167800 A | 7/2009 |
| JP | 2011-127447 A | 6/2011 |
| JP | 2012-149640 A | 8/2012 |
| JP | 2013-57302 A | 3/2013 |

OTHER PUBLICATIONS

Communication dated Dec. 20, 2017 from the State Intellectual Property P.R.C. in counterpart application No. 201580017221.2.
Japanese Notice of Reasons for Rejection for JP 2014-078651 dated Apr. 28, 2015.
Japanese Decision to Grant for JP 2014-078651 dated Jan. 5, 2016.
International Search Report for PCT/JP2015/060461 dated Apr. 28, 2015.
International Preliminary Report on Patentability issued from the International Bureau in counterpart International Application No. PCT/JP2015/060461, dated Oct. 20, 2016.
Communication dated May 2, 2017, from the State Intellectual Property Office of People's Republic of China in counterpart Application No. 201580017221.2.

* cited by examiner

TURBINE VENTILATION STRUCTURE

CROSS REFERENCE TO THE RELATED APPLICATION

This application is a continuation application, under 35 U.S.C. § 111(a), of international application No. PCT/JP2015/060461, filed Apr. 2, 2015, which claims priority to Japanese patent application No. 2014-078651, filed Apr. 7, 2014, the disclosure of which are incorporated by reference in their entirety into this application.

BACKGROUND OF THE INVENTION

Field of the Invention

The present invention relates mainly to a turbine ventilation structure of a gas turbine engine which includes an exhaust diffuser having a sheet metal double structure.

Description of Related Art

As a structure of an exhaust diffuser that performs gas exhaustion from a turbine in a gas turbine engine, a double structure that includes an outer tube and an inner tube that are each made of a sheet metal is generally used (see, for example, Patent Document 1). A gas turbine engine including an exhaust diffuser having such a structure requires appropriate ventilation (cooling) for thermally protecting members, formed by casting, such as a support structural member and a bearing box inside the diffuser. When a sufficient negative pressure can be ensured at an exhaust diffuser inlet under any operating condition, ventilation can be performed by taking air for ventilation into the exhaust diffuser by using the negative pressure.

It has been suggested that, in the case where air for ventilation is taken into the exhaust diffuser by using the negative pressure at the exhaust diffuser inlet, a gap between a strut that supports a bearing of a turbine rotor and a strut cover that covers the strut is used as a passage of air for ventilation, thereby efficiently cooling the structure inside the diffuser (e.g., Patent Documents 2 and 3).

RELATED DOCUMENT

Patent Document

[Patent Document 1] JP Laid-open Patent Publication No. 2004-197696

[Patent Document 2] JP Laid-open Patent Publication No. 2009-167800

[Patent Document 3] JP Laid-open Patent Publication No. 2011-127447

SUMMARY OF THE INVENTION

However, it may be difficult to ensure a negative pressure sufficient for ventilation under any operating condition. For example, under a partial load operation (idling) state of the engine, exhaust gas in the exhaust diffuser turns into a swirl flow and collides with the strut in an oblique direction. This generates turbulence in the exhaust flow in the vicinity of the strut. As a result, a sufficient negative pressure cannot be obtained in the exhaust diffuser.

In addition, in the case of taking air for ventilation into the exhaust diffuser from the exhaust diffuser inlet, air for ventilation flows along the inner wall of the exhaust diffuser. Thus, exhaust gas from a turbine is separated from the inner wall of the exhaust diffuser, resulting in reduction in the performance of the exhaust diffuser.

In order to solve the above-described problems, an object of the present invention is to provide a turbine ventilation structure that can generate a negative pressure sufficient for ventilation in an exhaust diffuser under any operating condition (load condition) of a gas turbine engine, without reducing the performance of the exhaust diffuser.

To attain the above-described object, a turbine ventilation structure in a gas turbine engine according to the present invention includes: an exhaust diffuser including an inner tube and an outer tube to form therebetween an annular exhaust passage through which an exhaust gas from a turbine passes; a strut extending across the exhaust diffuser from a housing disposed radially outward of the outer tube and configured to support a bearing inside the inner tube; a strut cover, disposed in the exhaust passage, configured to cover an outer circumference of the strut; and a connecting member disposed downstream of the strut cover in the exhaust passage. The connecting member includes therein a hollow portion in which an accessory is inserted and is configured to connect the housing and the inner tube. The housing includes a first intake port to introduce an air from outside. The strut cover has a discharge hole at a rear edge portion thereof. The turbine ventilation structure further includes a first ventilation passage extending from the first intake port through the hollow portion of the connecting member, then extending from an inner end portion of the strut through a cavity between the strut and the strut cover, and the discharge hole of the strut cover, into the exhaust passage.

In this configuration, the discharge hole for discharging air for ventilation is provided at the rear edge portion of the strut cover, which is a structure provided inside the exhaust diffuser, i.e., the discharge hole is provided on the downstream side of flow of the exhaust gas, whereby the negative pressure in a region rearward of the strut cover can be used to stably generate flow of the air for ventilation not only during the full load operation of the gas turbine engine, but also during the idling operation. Moreover, since the air for ventilation can be caused to flow through a region spaced apart from the inner wall of the exhaust diffuser, reduction in the performance of the exhaust diffuser can be prevented.

In the turbine ventilation structure according to an embodiment of the present invention, a plurality of the discharge holes may be provided so as to be spaced apart from each other along a direction in which the strut cover extends across the exhaust passage. In this configuration, by the plurality of the discharge holes being provided, flow of air for ventilation is uniformly distributed in the exhaust diffuser. As a result, the influence on flow of the exhaust gas is reduced, whereby reduction in the performance of the exhaust diffuser is more effectively prevented.

In the turbine ventilation structure according to an embodiment of the present invention, the strut cover may include a rear edge portion having a flat surface facing a downstream side of the exhaust gas, and a portion of the strut cover other than the rear edge portion has an airfoil-shaped transverse cross section. In this configuration, negative pressure can be more assuredly generated at the rear of the strut cover, while reducing the resistance of the strut cover.

In the turbine ventilation structure according to an embodiment of the present invention, the housing may be provided with a second intake port to introduce an air from outside, and the turbine ventilation structure may further include a second ventilation passage extending from the second intake port through between the housing and the outer tube, then extending through a cavity between the strut and the strut cover, and the strut cover, into the exhaust passage. In this configuration, by providing the second intake port separately from the first intake port and providing the second ventilation passage separately from the first ventilation passage, the structures around the exhaust diffuser can be cooled in a more effective manner. In particular, when the second intake port is provided at an axial position of the housing between a turbine outlet and the strut cover, a portion, of the housing, located near the turbine outlet and having a high temperature is cooled effectively.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an embodiment according to the present invention will be described with reference to the drawings. However, the present invention is not limited to the embodiment.

Figure 1:
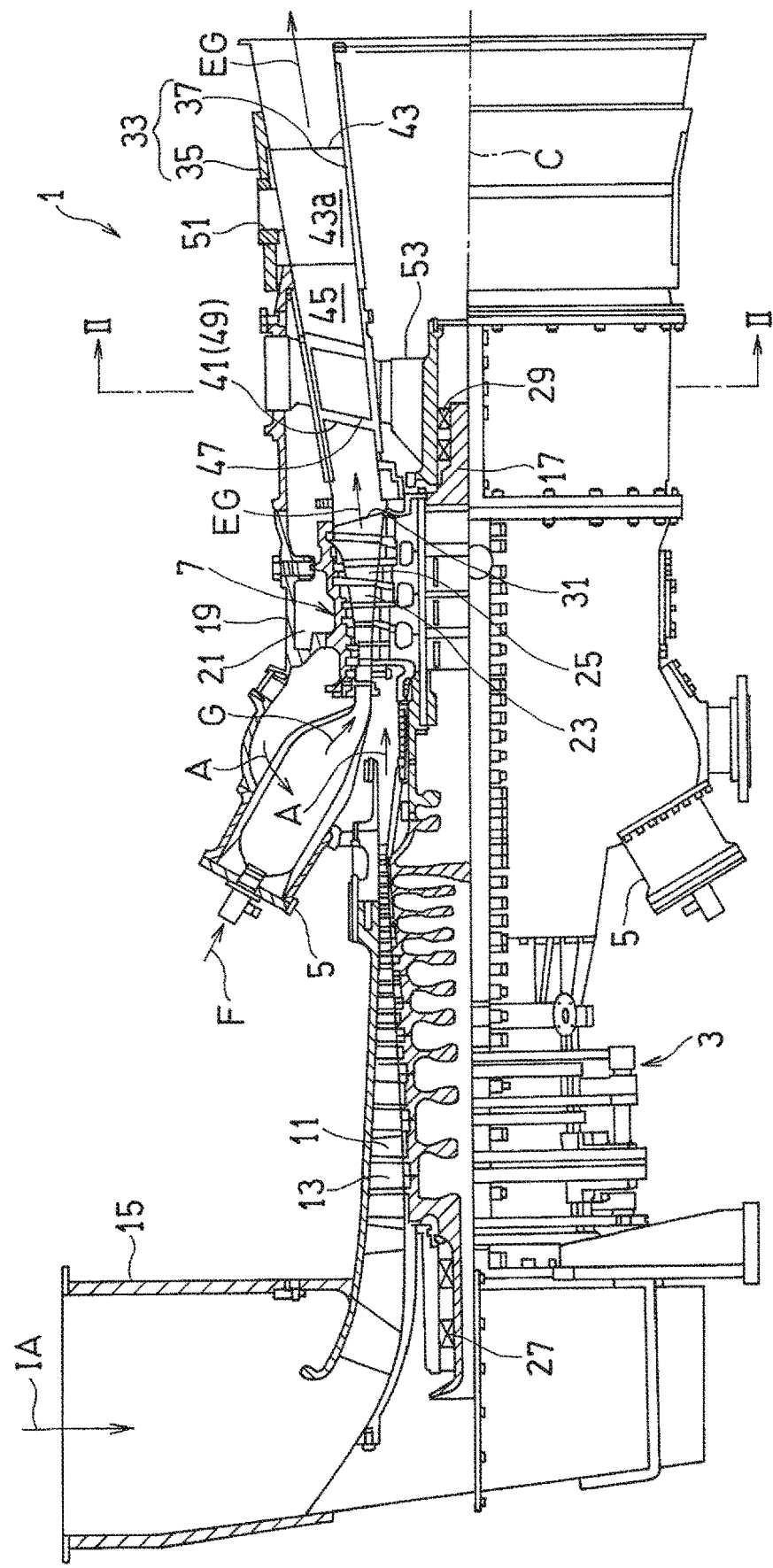
FIG. 1 is a partially broken-away side view of a gas turbine engine to which a ventilation structure according to an embodiment of the present invention is applied.

FIG. 1 is a partially broken-away side view of a gas turbine engine (hereinafter, simply referred to as a "gas turbine") 1 to which a turbine ventilation structure according to an embodiment of the present invention is applied. In FIG. 1, the gas turbine 1 compresses an intake air IA by a compressor 3, guides the intake air IA into a combustor 5, injects a fuel F into the combustor 5 so as to cause combustion, and drives a turbine 7 by using the obtained high temperature and high pressure combustion gas G. A plurality of the combustors 5 are disposed at regular intervals along the circumferential direction of the gas turbine 1. In the following description, in the axial direction of the gas turbine 1, the compressor 3 side may be referred to as "front side", and the turbine 7 side may be referred to as "rear side".

In the present embodiment, an axial-flow compressor is used as the compressor 3. The axial-flow compressor 3 compresses the intake air IA taken from an inlet collector 15 by using multiple rotor blades 11 and multiple stator blades 13 in combination. The rotor blades 11 are disposed on the outer circumferential surface of the front portion of a rotor 17 forming a rotational portion of the gas turbine 1, and the stator blades 13 are disposed on the inner circumferential surface of a housing 19.

The compressed air A obtained by compression by the compressor 3 is supplied to the combustor 5. The combustor 5 mixes the compressed air A supplied from the compressor 3 with the fuel F injected into the combustor 5 to cause combustion, and supplies the high temperature and high pressure combustion gas G to the turbine 7.

The turbine 7 includes a turbine casing 21 that is provided inward of the housing 19 and covers the rear portion of the rotor 17. To the inner circumferential portion of the turbine casing 21, a plurality of stages of turbine stator blades 23 are attached at predetermined intervals in the axial direction. On the other hand, a plurality of stages of turbine rotor blades 25 are provided at the rear portion of the rotor 17. The turbine stator blades 23 and the turbine rotor blades 25 are alternately disposed along the axial direction. The rotor 17 as a whole is rotatably supported by the housing 19 via bearings 27 and 29 at the front and the rear portions.

The rear end of the turbine rotor blade 25 located at the rearmost stage among the plurality of stages of turbine rotor blades 25 serves as a turbine outlet 31. The turbine outlet 31 is connected with an annular exhaust diffuser 33 that discharges an exhaust gas EG from the turbine 7 to the outside. The exhaust diffuser 33 includes an outer tube 35 and an inner tube 37 that are disposed concentrically with each other, and a first connecting member 41 and a second connecting member 43 that connect the outer tube 35 and the inner tube 37. Each of the outer tube 35 and the inner tube 37 is formed of a sheet metal made of a metal material excellent in heat resistance. The cavity between the outer tube 35 and the inner tube 37 forms an annular exhaust passage 45 through which the exhaust gas EG passes. The outer tube 35 is supported by the housing 19. A waste heat boiler (not shown) that is operated by using the heat of the exhaust gas EG is connected on the downstream side of the exhaust diffuser 33.

Figure 2:
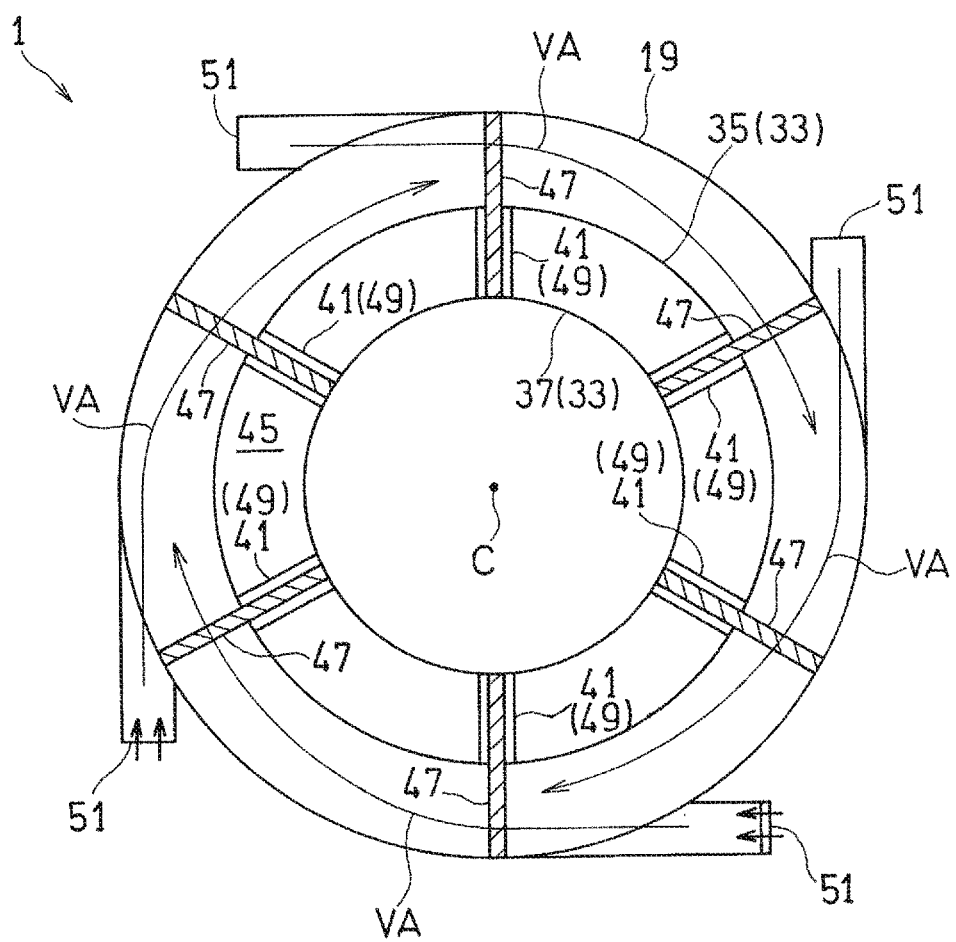
FIG. 2 is a schematic cross-sectional view taken along the line II-II in FIG. 1.
Figure 3:
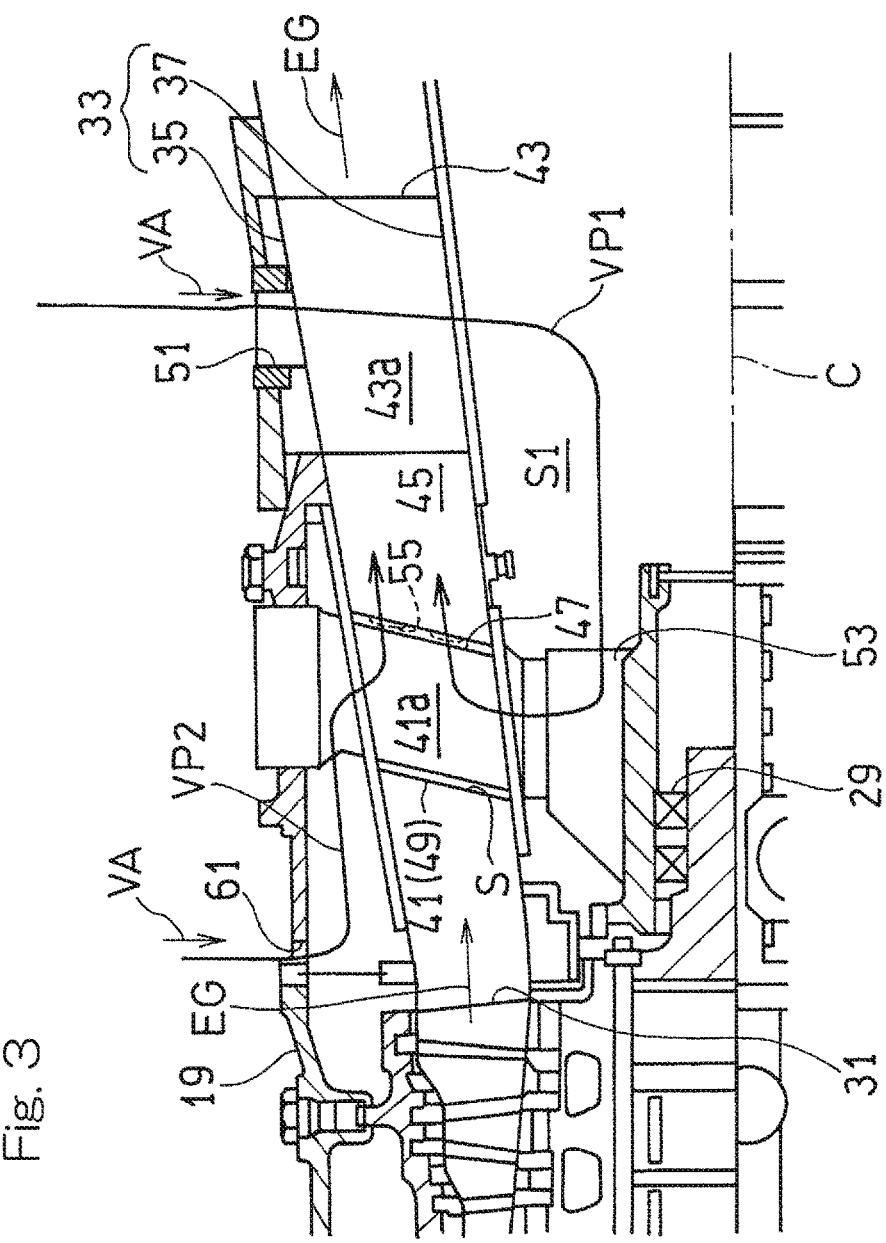
FIG. 3 is an enlarged cross-sectional view showing a peripheral portion of an exhaust diffuser of the ventilation structure shown in FIG. 1.

FIG. 2 is a cross-sectional view taken along the line II-II in FIG. 1. Although FIG. 2 shows a transverse cross section of a portion at which the first connecting member 41 and the strut 47 are disposed, the second connecting member 43 has a structure similar to the first connecting member 41 except that no strut is disposed thereinside. The first connecting member 41 (and the second connecting member 43) extends across the exhaust passage 45 in the radial direction. A plurality of, for example, six of the first connecting members 41 (and the second connecting members 43) are provided at equal intervals in the circumferential direction. As shown in FIG. 3, the first connecting members 41 and the second connecting members 43 are formed of sheet metals, and include respective hollow portions 41a and 43a. A strut 47 extending from the housing 19 across the exhaust diffuser 33 is inserted in the hollow portion 41a of each first connecting member 41. In other words, the first connecting member 41 forms a strut cover 49 that covers an outer circumference of the strut 47. A gap (cavity) S is formed between the strut 47 and the strut cover 49. On the other hand, a ventilation duct 51 is provided at an axial position, of the housing 19, which corresponds to a position on the outer side of the second connecting member 43 in the radial direction. The ventilation duct 51 forms a first intake port for introducing the outside air into the gas turbine 1 as the air VA for ventilation. An accessory such as a supply pipe (not shown) of a bearing lubricating oil is inserted in the hollow portion 43a of the second connecting member 43.

The strut 47 is disposed at an axial position, which substantially corresponds to the position of the rear bearing 29, and extends through the outer tube 35 of the exhaust diffuser 33 from a portion radially outward of the outer tube 35 across the exhaust passage 45 in the radial direction, further extends through the inner tube 37 from a portion radially outward of the inner tube 37, and is connected to a bearing support 53 provided radially outward of the rear bearing 29. In other words, the strut 47 supports the rear bearing 29 on the housing 19 via the bearing support 53. The first connecting member 41, the second connecting member 43, and the strut 47 may not necessarily extend across the exhaust passage 45 along the radial direction, and may extend diagonally relative to the radial direction across the exhaust passage 45.

Figure 4:
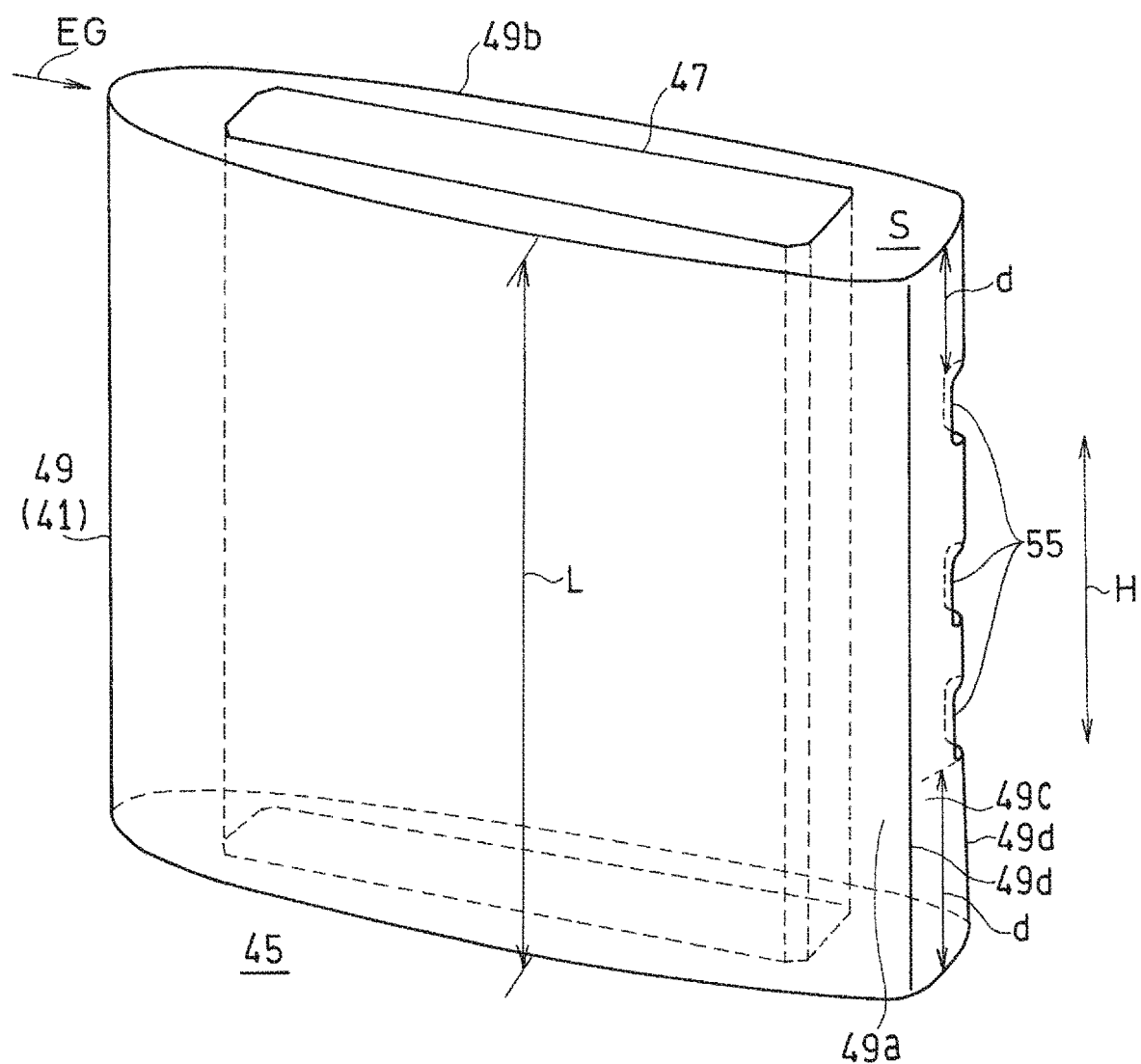
FIG. 4 is a perspective view showing a strut and a strut cover that are used in the ventilation structure shown in FIG. 1.

As shown in FIG. 4, the strut 47 and the strut cover 49 that surrounds the outer circumference of the strut 47 are elongated along the axial direction of the gas turbine 1. As can be seen from FIG. 5A, a cut face of the strut 47 which is cut along a cylindrical face concentric with the axis of the gas turbine 1 is elongated and formed in a substantially rectangular shape, and a cut face of the strut cover 49 is substantially airfoil-shaped. The strut cover 49 shown in FIG. 4A had a rear edge portion 49a provided with discharge holes 55 for discharging the air inside the strut cover 49 to the outside. The "rear edge portion" of the strut cover 49 refers to a downstream end in the flow direction of the exhaust gas EG (the axial direction of the gas turbine 1) and a portion in the vicinity thereof.

More specifically, in the strut cover 49, the rear edge portion 49a has a flat surface facing the rear side (a downstream side in the flow of the exhaust gas EG), and a portion of the strut cover 49 other than the rear edge portion 49a is formed so as to have an airfoil-shaped transverse cross section. That is, the strut cover 49 includes a curved portion 49b having an airfoil-shaped curved surface and a flat surface portion 49c having a flat surface, the curved portion 49b forming the front portion and the side portions and the flat surface portion 49c forming the rear portion. In the present embodiment, the discharge holes 55 are provided in only one of two corner portions 49d each corresponding to the boundary between the curved portion 49b and the flat surface portion 49c.

Further, a plurality of (in this example, three) discharge holes 55 are provided in the strut cover 49 so as to be spaced apart from each other along a direction in which the strut cover 49 extends across the exhaust passage 45, i.e., along a height direction H (in this example, the radial direction of the gas turbine 1) of the strut cover 49. The plurality of the discharge holes 55 allow uniform distribution of flow of air VA for ventilation, which is introduced into the exhaust passage 45 through a first ventilation passage VP1 and a second ventilation passage VP2 which will be described below. As a result, the influence of flow of the air VA for ventilation on flow of the exhaust gas EG is reduced, thereby effectively preventing reduction in the performance of the exhaust diffuser 33.

The positions at which the discharge holes 55 are provided in the strut cover 49 are not particularly limited, as long as they are located at the rear edge portion 49a of the strut cover 49. For example, the discharge holes 55 may be provided in the flat surface portion 49c of the strut cover 49, or may be provided at a portion of the curved portion 49b which is in the vicinity of the corner portion 49d.

Figure 5A:
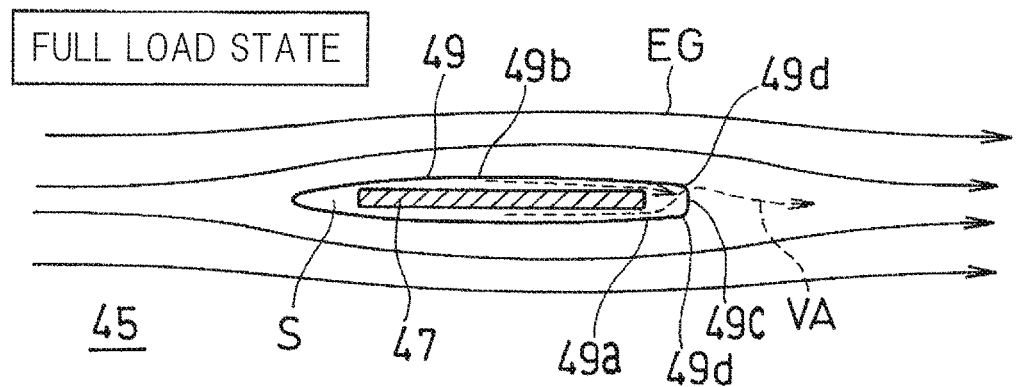
FIG. 5A is a schematic diagram illustrating the function of the ventilation structure shown in FIG. 1 when it is under a full load state.
Figure 5B:
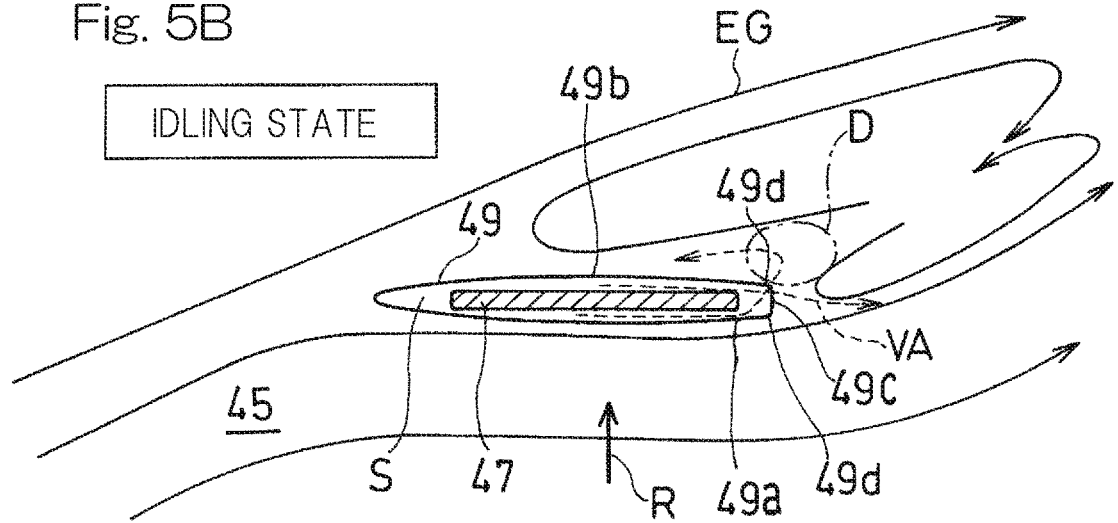
FIG. 5B is a schematic diagram illustrating the function of the ventilation structure shown in FIG. 1 when it is under an idling state.

Under the full load state shown in FIG. 5A, the exhaust gas EG flows parallel to the axis of the gas turbine 1, i.e., parallel to the longitudinal direction of the strut cover 49. However, under the partial load state including an idling state, the exhaust gas EG has a swirling component about the axis of the gas turbine 1. Therefore, in the present embodiment, the discharge holes 55 are provided in only one corner portion 49d, of the two corner portions 49d of the rear edge portion 49a of the strut cover 49, which is located on the downstream side in a swirling direction R of the exhaust gas EG under the idling state of the gas turbine 1. Accordingly, the discharge holes 55 are provided in the vicinity of a region D where the negative pressure in the periphery of the strut cover 49 is highest not only under the full load operation state shown in FIG. 5A, but also under the idling state shown in FIG. 5B in which insufficient negative pressure for taking in the air VA for ventilation is particularly problematic. Accordingly, the air VA for ventilation can be assuredly taken into the exhaust diffuser 33 under any operating state of the gas turbine 1.

As shown in FIG. 4, the range, in the transverse direction H, where the discharge holes 55 are provided is a range in which a distance d from any one of both ends in the transverse direction H of the strut cover 49 is preferably greater than or equal to 0.1 L, more preferably greater than or equal to 0.15 L when the height L of the strut cover 49, i.e., the distance in the radial direction between the inner circumferential surface of the outer tube 35 and the outer circumferential surface of the inner tube 37 is a reference. By the discharge holes 55 being provided in such a range, separation of the exhaust gas EG from the inner wall surface of the exhaust diffuser 33 (FIG. 1) due to the air VA for ventilation can be prevented, thereby preventing reduction in the performance of the exhaust diffuser 33.

The strut cover 49 as a whole may be formed to have a complete airfoil-shaped transverse cross section by forming the rear portion in, for example, the shape of a curved surface extending continuously from the curved portion 49b, without providing the flat surface portion 49c on the strut cover 49. However, negative pressure can be more assuredly generated at the rear (on the downstream side) of the strut cover 49 by forming the rear portion of the strut cover 49 as the flat surface portion 49c.

As shown in FIG. 3, the housing 19 is further provided with a second intake port 61 extending through the housing 19, separately from the ventilation duct 51 serving as the first intake port. The outside air is introduced as the air VA for ventilation into the gas turbine 1 also from the second intake port 61. More specifically, the second intake port 61 is provided at an axial position of the housing 19, which corresponds to a position radially outward of the turbine outlet 31. Although the axial position at which the second intake port 61 is provided is not limited to the illustrated example, the second intake port 61 is provided, preferably at an axial position in front of the ventilation duct 51, more preferably at an axial position between the turbine outlet 31 and the strut cover 49.

In the ventilation structure of the gas turbine 1 having such a structure, the negative pressure generated in a portion downstream of the discharge holes 55 of the strut cover 49 causes the outside air to be introduced as the air VA for ventilation via the ventilation duct (first intake port) 51 and the second intake port 61, whereby two passages, namely, ventilation passages VP1 and VP2 are formed. Specifically, a first ventilation passage VP1 is formed so as to extend from the outside of the housing 19 through the hollow portion 43a of the second connecting member 43, then extend from the inner diameter-side end portion of the strut 47 through the cavity S between the strut 47 and the strut cover 49, and through the discharge holes 55 of the strut cover 49, into the exhaust passage 45. Further, a second ventilation passage VP2 is formed so as to extend from the second intake port 61 through between the housing 19 and the outer tube 35, then extend through the cavity S between the strut 47 and the strut cover 49, and through the discharge holes 55 of the strut cover 49, into the exhaust passage 45.

By the first ventilation passage VP1, the bearing 29 is cooled via the bearing support 53, and the cavity S1 inside the exhaust diffuser 33 is ventilated. By the second ventilation passage VP2, a portion, of the housing 19, located near the turbine outlet 31 and having a high temperature is cooled effectively.

Although the second intake port 61 and the second ventilation passage VP2 may be omitted, the structures around the exhaust diffuser 33 can be effectively cooled in a wider range by providing the second intake port 61 separately from the ventilation duct (first intake port) 51 and providing the second ventilation passage VP2 independently from the first ventilation passage VP1.

In the turbine ventilation structure according to the present embodiment, the discharge holes 55 for discharging the air VA for ventilation are provided at the rear edge portion 49a of the strut cover 49, which is a structure provided inside the exhaust diffuser 33, i.e., the discharge holes 55 are provided on the downstream side of flow of the exhaust gas EG, whereby the negative pressure in a region rearward of the strut cover 49 can be used to stably generate flow of the air VA for ventilation not only during the full load operation of the gas turbine engine 1, but also during the idling operation. Moreover, since the air VA for ventilation can be caused to flow through a region spaced apart from the inner wall of the exhaust diffuser 33, reduction in the performance of the exhaust diffuser 33 can be prevented. Although the present invention has been fully described in connection with the preferred embodiment thereof with reference to the accompanying drawings, various additions, modifications, or deletions may be made without departing from the gist of the invention. Therefore, these are construed as included within the scope of the present invention.

REFERENCE NUMERALS

1 . . . Gas turbine engine
3 . . . Compressor
5 . . . Combustor
7 . . . Turbine
17 . . . Rotor (Rotary shaft)
19 . . . Housing
27, 29 . . . Bearing
33 . . . Exhaust diffuser
35 . . . Outer tube
37 . . . Inner tube
43 . . . Second connecting member (connecting member)
45 . . . Exhaust passage
47 . . . Strut
49 . . . Strut cover
49a . . . Rear edge portion of strut cover
51 . . . Ventilation duct (first intake port)
55 . . . Discharge hole
61 . . . Second intake port
EG . . . Exhaust gas
VA . . . Air for ventilation
VP1 . . . First ventilation passage
VP2 . . . Second ventilation passage

What is claimed is:

1. A turbine ventilation structure in a gas turbine engine, comprising:
   an exhaust diffuser including an inner tube and an outer tube to form therebetween an annular exhaust passage through which an exhaust gas from a turbine passes;
   a strut extending across the exhaust diffuser from a housing disposed radially outward of the outer tube and configured to support a bearing inside the inner tube;
   a strut cover, disposed in the exhaust passage, configured to cover an outer circumference of the strut; and
   a connecting member connecting the housing and the inner tube, the connecting member being disposed downstream of the strut cover in the exhaust passage and including therein a hollow portion in which an accessory is inserted in the connecting member,
   wherein the housing includes a first intake port to introduce an air from outside of the gas turbine,
   the strut cover has a discharge hole at a rear edge portion thereof, and all discharge holes, including the discharge hole, provided in the rear edge portion of the strut cover are spaced away from the inner tube and the outer tube,
   the turbine ventilation structure further comprising
      a first ventilation passage extending from the first intake port through the hollow portion of the connecting member, then extending from an inner end portion of the strut through a cavity between the strut and the strut cover, and the discharge hole of the strut cover, into the exhaust passage, and
   wherein the discharge hole is provided in a corner portion of the strut cover, the corner portion being a boundary between a surface of the rear edge portion and a side portion of the strut cover.

2. The turbine ventilation structure as claimed in claim 1, wherein a plurality of discharge holes, including the discharge hole, are provided so as to be spaced apart from each other along a direction in which the strut cover extends across the exhaust passage.

3. The turbine ventilation structure as claimed in claim 1, wherein the surface of the rear edge portion is a flat surface facing a downstream side of the exhaust gas, and a portion of the strut cover other than the rear edge portion has an airfoil-shaped transverse cross section.

4. The turbine ventilation structure as claimed in claim 1, wherein the housing is provided with a second intake port to introduce an air from outside the gas turbine engine, the turbine ventilation structure further comprising
   a second ventilation passage extending from the second intake port through between the housing and the outer tube, then extending through the cavity between the strut and the strut cover, and the strut cover, into the exhaust passage.

5. The turbine ventilation structure as claimed in claim 4, wherein the second intake port is provided at an axial position of the housing between a turbine outlet and the strut cover.

6. The turbine ventilation structure as claimed in claim 1, wherein
   the surface of the rear edge portion of the strut cover is a flat surface portion facing a downstream side of the exhaust gas, and the side portion of the strut cover is formed as a curved portion having an airfoil-shaped transverse cross section, and all discharge holes, including the discharge hole, provided in the rear edge portion of the strut cover are provided in only one of two corner portions, including the corner portion, that each correspond to a boundary between the curved portion and the flat surface portion.

7. A turbine ventilation structure in a gas turbine engine, comprising:

an exhaust diffuser including an inner tube and an outer tube to form therebetween an annular exhaust passage through which an exhaust gas from a turbine passes;

a strut extending across the exhaust diffuser from a housing disposed radially outward of the outer tube and configured to support a bearing inside the inner tube;

a strut cover, disposed in the exhaust passage, configured to cover an outer circumference of the strut; and a connecting member connecting the housing and the inner tube, the connecting member being disposed downstream of the strut cover in the exhaust passage and including therein a hollow portion in which an accessory is inserted in the connecting member, wherein the housing includes a first intake port to introduce an air from outside of the gas turbine, the strut cover has a discharge hole at a rear edge portion thereof, and all discharge holes, including the discharge hole, provided in the rear edge portion of the strut cover are spaced away from the inner tube and the outer tube, the turbine ventilation structure further comprising a first ventilation passage extending from the first intake port through the hollow portion of the connecting member, then extending from an inner end portion of the strut through a cavity between the strut and the strut cover, and the discharge hole of the strut cover, into the exhaust passage, and wherein all discharge holes, including the discharge hole, provided in the rear edge portion of the strut cover are spaced away from both the inner tube and the outer tube by at least a distance of 0.1 L, wherein L defines a radial distance between the inner tube and the outer tube.

8. A turbine ventilation structure in a gas turbine engine, comprising:

an exhaust diffuser including an inner tube and an outer tube to form therebetween an annular exhaust passage through which an exhaust gas from a turbine passes;

a strut extending across the exhaust diffuser from a housing disposed radially outward of the outer tube and configured to support a bearing inside the inner tube;

a strut cover, disposed in the exhaust passage, configured to cover an outer circumference of the strut; and a connecting member connecting the housing and the inner tube, the connecting member being disposed downstream of the strut cover in the exhaust passage and including therein a hollow portion in which an accessory is inserted in the connecting member, wherein the housing includes a first intake port to introduce an air from outside of the gas turbine, the strut cover has a discharge hole at a rear edge portion thereof, and all discharge holes, including the discharge hole, provided in the rear edge portion of the strut cover are spaced away from the inner tube and the outer tube, the turbine ventilation structure further comprising a first ventilation passage extending from the first intake port through the hollow portion of the connecting member, then extending from an inner end portion of the strut through a cavity between the strut and the strut cover, and the discharge hole of the strut cover, into the exhaust passage, and wherein the discharge hole is adjacent to a region where negative pressure in a periphery of the strut cover is the highest during an idling state of the gas turbine engine.

* * * * *